United States Patent [19]

Huba et al.

[11] 3,899,501

[45] Aug. 12, 1975

[54] CONTINUOUS SACCHARIN PROCESS

[75] Inventors: Francis Huba; Robert G. Banner, both of Painesville, Ohio

[73] Assignee: Diamond Shamrock Corporation, Cleveland, Ohio

[22] Filed: Feb. 8, 1973

[21] Appl. No.: 330,737

Related U.S. Application Data

[63] Continuation-in-part of Ser. No. 52,363, July 6, 1970, abandoned.

[52] U.S. Cl. ............................................... 260/301
[51] Int. Cl.² ....................................... C07D 275/06
[58] Field of Search .................................. 260/301

[56] References Cited

UNITED STATES PATENTS 1,366,349   3/1921   Bebie ................................. 260/301

*Primary Examiner*—Richard J. Gallagher
*Attorney, Agent, or Firm*—William A. Skinner

[57] ABSTRACT

Saccharin is prepared by a continuous process using o-toluenesulfonamide, a hexavalent chromium compound, sulfuric acid and water. Reactants are fed into a reactor at rates which provide continuous oxidation of o-toluenesulfonamide to saccharin which is separated from the reaction mixture and purified.

4 Claims, No Drawings

CONTINUOUS SACCHARIN PROCESS

CROSS REFERENCE TO RELATED APPLICATION

This application is a continuation-in-part of our co-pending application, Ser. No. 52,363 — Huba and Banner filed July 6, 1970 and now abandoned.

BACKGROUND OF THE INVENTION

1. Field of the Invention

This invention relates to a continuous saccharin process and more particularly to a continuous process employing o-toluenesulfonamide, hexavalent chromium compound, sulfuric acid and water.

2. Description of the Prior Art

Saccharin also known as 2,3-dihydro-3-oxobenzisosulfonazole is used as a sweetening agent when sugar is contraindicated.

One of the processes for the production of saccharin involves the oxidation of toluenesulfonamide with a hexavalent chromium compound in sulfuric acid. This process is preferred to others because the usefulness of the by product, chromic sulfate liquor in the tanning of leather.

At the present time, production of saccharin involving chromic oxidation is by the batch process. The batch process requires a large excess of sulfuric acid and a long reaction time. The long reaction time impairs the economics of the process and the large excess of sulfuric acid creates serious pollution problems.

An even more important disadvantage of this batch process is that the long reaction time results in the production of undesirable by-products and impurities as is evidenced by discoloration of the product. A costly and elaborate purification process is required to reduce discoloration and to remove some of the impurities. This purification process is described in U.S. Pat. No. 2,745,840 — Comte patented May 15, 1956.

Although there are rigorous specifications on the purity of saccharin intended for human consumption, trace impurities, below the detachable level, may remain in the saccharin. It seems prudent to produce a more pure saccharin, since this sweetener is used on a continuing basis by large segments of the population. Saccharin has been used by human beings for more than 70 years; it is needed. There is no reliable substitute available.

One of the solutions toward a purer saccharin is a process, which eliminates or significantly reduces the formation of those by-products and impurities, whose presence are evidenced by the color of the saccharin.

SUMMARY OF THE INVENTION

This invention relates to a continuous process for the production of saccharin which results in a significantly purer saccharin within a fraction of the time needed in the batch process and with less sulfuric acid. In this process, o-toluenesulfonamide, sulfuric acid of a proper concentration and a hexavalent chromium compound are fed into the reactor at those rates required to oxidize the o-toluenesulfonamide to saccharin over a residence time in the reactor from about 0.2 to 4 hours. Reaction products are continuously removed from the reactor and separated to recover the saccharin.

O-toluenesulfonamide and from about 0.8 to 4 moles of a hexavalent chromium compound per mole of o-toluenesulfonamide, from about 2 to about 20 moles of sulfuric acid per mole of o-toluenesulfonamide and from 0.04 to about 2 liters of water per mole of o-toluenesulfonamide are added at such rates to a reactor maintained at a reaction temperature of from about 30° to 70°C so that oxidation of o-toluenesulfonamide to saccharin occurs over a residence time in the reactor of from about 0.2 to about 4 hours. Reaction products are removed continuously from the reactor, separated and processed to obtain saccharin and chrome liquor as separate products. This continuous process can be used to produce about five times the quantity of saccharin produced by a batch process per unit volume of reactor space under comparable conditions. Further, this continuous process produces significantly less colored saccharin.

DESCRIPTION OF THE PREFERRED EMBODIMENTS

The reactants can be added to the reactor in any suitable form as solids or liquids. For example, o-toluenesulfonamide can be added directly to the reactor as a powder. Sulfuric acid can be added directly to the reactor as a 65 to 85% by weight solution. The hexavalent chromium compound can be added to the reactor as a solid, dispersion or solution. Useful hexavalent chromium compounds includes sodium chromate, sodium dichromate, chromic acid or the like. If desired, a hexavalent chromium compound such as crude chromic acid can be dissolved in water to obtain an aqueous solution which is then mixed with concentrated sulfuric acid to obtain a slurry of chromic acid in a sulfuric acid solution which is then cooled to room temperature and added as a separate feed.

The reactants can be added to a reactor maintained at a temperature from about 45° to about 70°C as three separate feeds, i.e., (1) a o-toluenesulfonamide feed, (2) a hexavalent chromium compound feed and (3) a sulfuric acid feed. Additions can be made at such rates that for from about 0.3 to about 1.2 moles of o-toluenesulfonamide, there is present from about 1.5 to 3 moles of hexavalent chromium compound, from about 3 to about 15 moles of sulfuric acid and from 0.05 to about 1.0 liter of water per mole of o-toluenesulfonamide in the reactor and oxidation of o-toluenesulfonamide to saccharin occurs over a reaction time of from about 0.5 to about 2 hours. Reaction products are removed continuously from the reactor, separated and processed to obtain the product, saccharin. A trivalent chromium salt in the form of chrome liquor is obtained as a by-product. Chrome liquor, which contains chromic sulfate, is useful as a tanning agent for leather.

For example, the reactants can be added separately, i.e., as a hexavalent chromium compound such as chromic acid in solid form, o-toluenesulfonamide in powdered form and sulfuric acid as a solution. These reactants are added simultaneously and continuously to the reactor. Reactant additions are made at rates which provide a mean residence time of about 0.5 to about 2.0 hours in the reactor. A mixture of reaction products is continuously discharged from the reactor. This mixture is then cooled and if desired, diluted with water. The cooled mixture is filtered to separate the solid crude saccharin from the trivalent chromium compound liquor and the crude saccharin filter cake washed with water to remove traces of the chromium compound. Then the filter cake is dispersed in an alkali solution such as dilute sodium carbonate. Saccharin dissolves in the alkali solution while o-toluenesulfonamide does not. The resulting saccharin solution is filtered to remove undissolved o-toluenesulfonamide, the unreacted starting material. The recovered o-toluenesulfonamide is washed with water and returned to the reaction.

After removal of unreacted o-toluenesulfonamide by filtration, saccharin is precipitated from the alkaline saccharin solution by acidification with dilute sulfuric or hydrochloric acid. Precipitated saccharin is separated by filtration, washed and dried.

In the continuous process of the present invention, reactants are continuously introduced into a reactor where reaction occurs while a mixture of reaction products is being removed from the reactor. The reactor may be equipped with a mixing means to provide intimate contact between the reactants. This mixing means may be an agitator, circulating pump or other type of mixer, or a combination of these. If desired, there may be a plurality of blades, paddles or the like attached to the mixing means. The reaction is quite exothermic so means for adequate heat control to keep the reaction at the desired temperature must be provided.

During reaction, a mixture of reaction products is being continuously removed from the reactor and transferred to a filter where the mixture is separated into two distinct and separate phases, i.e., a solid phase which is crude saccharin as a filter cake and a liquid phase which is the trivalent chromium fraction as the filtrate.

For a fuller understanding of the nature and objects of this invention, reference may be made to the following examples. These examples are given merely to illustrate the invention and are not to be construed in a limiting sense. All quantities, proportions and percentages are by weight and all references to temperature are °C unless otherwise indicated.

EXAMPLE 1

This example illustrates the continuous process of the present invention wherein the reactor was a 1-liter glass kettle having auxiliary equipment for continuous feeding, discharging, filtering during processing. The reactor was a 1-liter, 4-neck glass resin pot equipped with a glass cooling coil positioned along the inner wall so that the coil serves as a multiple baffle. The reactor was also equipped with an agitator having five paddles. Four paddles were slanted so as to move the reaction mixture downward and the fifth paddle, the bottom paddle, arranged to move the reaction mixture out and upward. Agitator speed varied between 300–400 rpm. Volume of the reaction mixture was maintained by an adjustable overflow tube and level of the mixture was held at or below the top paddle. Reaction temperatures were measured by a thermometer.

The following reactants were charged continuously and simultaneously to the reactor over 6.25 hours:
1. 2460 ml of a sulfuric acid solution containing 2890 g (29.5 m) of technical grade sulfuric acid;
2. 1894 g of solid crude chromic acid having the following composition: 70.5% $CrO_3$, 19% $NaHSO_4$, 1.5% $H_2SO_4$, and 9% $H_2O$ and representing 1334 g (13.34 m) of $CrO_3$; and
3. 769 g (4.43 m) of powdered o-toluenesulfonamide (o-TSA).

Initially, about 200 ml of the sulfuric acid solution was charged to the reactor, stirred and heated to 58°C. The other reactants and additional sulfuric acid solution were then added continuously and simultaneously. During the process, reaction temperature was maintained at 56°–61°C. After 50 minutes of reaction and when the reaction mixture volume was about 700 ml, continuous discharge of reaction mixture was begun. The addition rate and the discharge rate were adjusted to maintain this volume. Mean residence time of reactants in the reactor was about 50 minutes.

The crude saccharin was separated by filtration as a filter cake which was then washed free of chrome liquor. Then filter cake was dispersed in 2,200 ml of 1M sodium carbonate solution at room temperature. This dispersion was agitated for 20 minutes to dissolve the saccharin and then filtered to remove any undissolved o-toluenesulfonamide. The undissolved material was then washed and dried. A total of 206 g (1.2 m) of unreacted o-toluenesulfonamide was recovered. This represented 26.9% of starting material which was satisfactory for use in a subsequent reaction.

Saccharin was precipitated from the sodium carbonate filtrate by adding 1,400 ml 20% of sulfuric acid solution with agitation. The saccharin precipiate was filtered, washed and dried. It weighted 512 g (2.8 m), represented a yeild of 85.7% based on the unrecovered o-toluenesulfonamide, was 98.7% pure, contained 1.3% o-toluenesulfonamide and melted at 226°–229°C.

The quality of the saccharin was also determined by measuring its color in solution by the standard A.P.-H.A. procedure established by the American Public Health Association. One gram of the saccharin dissolved in 100 ml of 10% sodium carbonate solution gave an APHA color of 20.

The production rate of saccharin in this continuous process was 123 g/L/hr.

This continuous process produced over 7.5 times more saccharin per unit volume and used 30.9% less sulfuric acid per lb saccharin under comparable conditions than the batch process described in Example 2.

EXAMPLE 2

This example is a batch process and is outside the scope of this invention. Into a ½-liter flask, 31.1 g (0.1816 m) o-toluenesulfonamide (o-TSA) and 100 ml (1.2 molar) sulfuric acid were charged. The charge was heated to 56°C and 60 g sodium bichromate was added in small portions over ½ hour while the reaction temperature was maintained at 54°–58°C. After the reactants were charged, the reaction mixture was stirred at 60°C for an additional 3.5 hours.

Then 105 ml water was added; the mixture cooled and filtered to remove the solid product. The resulting filter cake was washed, then dissolved in 200 ml 10% sodium carbonate solution and filtered. Saccharin was precipitated from the solution by adding 200 ml 20% sulfuric acid, filtered, washed and dried to obtain 14.44 g of product which melted at 227°–229°C. and represented a 76.5% yield. Recovery of o-TSA was 13.73 g or 44% of the original charge. The production rate was 16.4g/L/hr. The APHA color of a saccharin solution prepared from this product and measured by the procedure given in Example 1 was 40. The saccharin produced by this batch process had twice the color of the saccharin produced by the continuous process described in Example 1.

EXAMPLE 3

This example demonstrates the batch process described in Japanese Patent No. 176,553 (7/21/48).

A total of 300 ml (60%) sulfuric acid solution, which represented 265 g (2.7 m) of sulfuric acid, was charged into a 500 ml flask. The acid charge was agitated at 15°C while 68 g (0.68 m) of chromic acid crushed flakes and 10 g (0.06 m) of o-toluenesulfonamide powder were added. Reaction temperature was allowed to rise to 30°C over 1 hour, then to 44°C over the following 0.5 hour and maintained at 43°C for an additional two hours. Then the reaction mixture was cooled, 150 ml water was added and the mixture filtered to recover crude saccharin as the filter cake. The crude saccharin filter cake was washed and then dissolved in sodium carbonate solution. The resulting solution was filtered and acidified with 20% sulfuric acid soution to precipitate saccharin. None of the starting material, o-toluenesulfonamide, was recovered. A total of 8.6 g of dried saccharin was obtained and represented an 80% yield. The product was slightly tan colored and melted at 227°–229° C.

EXAMPLE 4

This example also illustrates a batch process which is outside the scope of this invention.

Into a 500 ml reaction flask, 100 g concentrated sulfuric acid and 38.8 g of o-toluenesulfonamide (o-TSA) were added. A clear solution was obtained after a few minutes of agitation. To this solution, 50 g of chipped ice was gradually added, while the flask was being cooled externally to keep the temperature below 45°C at all times. A slurry of a very fine precipitate was obtained and then heated to 48°C. To this slurry, 65 g of crude (0.5 m) chromic acid anhydride was added portionwise at 48°–60°C over 30 minutes. After stirring an additional 1.5 hours at 58°–66°C, this mixutre was diluted with water, cooled and filtered to recover the solid product as a filter cake. The filter cake was washed, dissolved in 150 ml 10% sodium carbonate solution and filtered. Recovery of unreacted o-TSA was 38.2%.

Saccharin was precipitated from the above filtrate by addition of 100 ml 20% sulfuric acid, washed and then dried to obtain 22.7 g of product which melted at 227°–230°C and represented 88.7% yeild. The APHA color of a saccharin solution prepared from this product and measured by the procedure given in Example 1 was 40.

EXAMPLE 5

This example demonstrates a very substantial reduction in the sulfuric acid usage and is within the scope of the present invention.

To facilitate easier handling and metering of the oxidant, as in the case of large scale plant operations, an aqueous solution of crude chromic acid was charged. In order to avoid any permanent discoloration of the saccharin, which usually occurs when an oxidant solution is added directly to the reaction mixture, the aqueous oxidant solution was metered into a jacketed mixer, simultaneously with concentrated sulfuric acid. A hot slurry was formed, agitated, then cooled to room temperature and fed into the reactor at a predetermined rate. Powdered o-toluenesulfonamide was also charged to the reactor at a predetermined rate.

Before continuous addition of the reactants was begun, 360 ml (12 m) sulfuric acid (424 g of 100% $H_2SO_4$) and 111.6 g (0.65 m) of o-toluenesulfonamide were charged into a 3-liter reactor, agitated and heated to 50°C. Then 200 g crude crystalline chromic acid representing 1.5 ml of $CrO_3$ was added portionwise to the agitated reaction mixture at 50°–51°C over 30 minutes.

During the next 3.5 hours of the process, 512 g (2.99 m) of o-toluenesulfonamide, 1000 ml (18.3 m) of concentrated sulfuric acid and 1000 ml solution of crude chromic acid crystals representing 7.45 m of $CrO_3$ were added simultaneously and continuously. Vigorous agitation of the viscous mixture and temperatures between 56°–60°C were maintained. After 1.67 hours of addition of reactants and when the volume of the reaction mixture was about 2 liters, continuous removal of the reaction mixture was begun at a rate sufficient to maintain this volume. When addition of reactants was completed, agitation and discharge rates were maintained for an additional 50 minutes. The remaining reaction mixture in the reactor was then cooled and removed.

After discharge from the reactor, the reaction mixture was diluted with an equal volume of water, then passed through a cooler and thereafter filtered to separate the crude saccharin as a filter cake from the chrome liquor as the filtrate.

The crude saccharin filter cake was washed with water to remove traces of chrome liquor. Then the filter cake was dispersed in 10% sodium carbonate solution to dissolve the saccharin. Unreacted o-toluenesulfonamide remained as an insoluble residue. The sodium carbonante extract was filtered to remove the isoluble residue. A total of 71.4 g. (0.417 m) of unreacted o-toluenesulfonamide representing 11.3% of the starting material was recovered. The recovered material melted at 154°–158°C and was used in a subsequent preparation.

The sodium carbonate filtrate was acidified by the gradual addition of 20% sulfuric acid to precipitate saccharin which was then filtered, washed and dried. A total of 513 g (2.71 m) of saccharin melting at 226°–229°C and representing a yield of 85.5%, based on the unrecovered o-toluenesulfonamide, was obtained. The APHA color of sacchrain solution prepared from this product and measured by the procedure given in Example 1 is 20.

The continuous processes of Examples 1 and 5 required 10.53 and 8.04 moles of sulfuric acid to produce 1 mole of saccharin which represented acid reductions of 29 and 46% when compared to the batch process of Example 2 which required 15.24 moles of sulfuric acid per mole of saccharin.

EXAMPLES 6 and 7

The reactants and conditions set forth in Table I were employed in the continuous process described in Example 1.

Results obtained in each example are set forth in Table I. These results further demonstrate the advantages of the continuous process over the batch process employed in the prior art.

Comparison with the batch process examples described here and with the published conventional saccharin batch process showed that this continuous process had the following advantages:

a. The continuous method is about 5 times more efficient than the conventional batch process, thus the relative labor and the associated costs can be lowered.

b. The size of the reactor can be reduced to about one-fifth of that used in a batch process to produce the same quantity of product. This would permit a substantial reduction in plant investment costs.

c. The sulfuric acid requirement is reduced to almost half, that is, a 46% reduction per pound of saccharin produced. Acid reduction improves manufacturing economics and reduces waste disposal problems.

d. The continuous method also provides a saccharin of improved quality.

It is to be understood that although this invention has been described with specific reference to particular embodiments thereof, it is not to be so limited, since changes and alterations therein may be made which are within the full intended scope of this invention as defined by the appended claims.

TABLE 1

ADDITIONAL EXAMPLES SHOWING CONTINUOUS SACCHARIN PRODUCTION AND QUALITY

| EXAMPLE.: | 6 | 7 |
|---|---|---|
| PROCESS | Continuous | Continuous |
| REACTANTS | | |
| o-toluenesulfonamide(g) | 351 | 349 |
| Moles (o-TSA) | 2.05 | 2.04 |
| SULFURIC ACID (ml) | 1060 | 1120 |
| Concentration: % | 69 | 64 |
| Wt. g of 100% | 1325 | 1315 |
| Moles | 13.51 | 13.42 |
| OXIDIZER | $CrO_3$ | $CrO_3$ |
| Crude g | 852 | 845 |
| Pure g | 639 | 633 |
| Moles | 6.39 | 6.33 |
| REACTOR CONDITIONS | | |
| Temperature: °C | 58–62 | 57–60 |
| Total Reaction mixture ml | 700 | 700 |
| Residence time, min. | 50 | 50 |
| Total operating time: hrs. | 3.25 | 3.5 |
| RESULTS | | |
| Reacted o-TSA % | 75.6 | 76.7 |
| Saccharin produced (g) | 245.3 | 246.0 |
| Yield of Saccharin % | 86.3 | 86.3 |
| A.P.H.A. COLOR | 20 | 20 |

What is claimed is:

1. A continuous process for producing saccharin of improved quality which comprises
    a. adding o-toluenesulfonamide, a hexavalent chromium compound, sulfuric acid and water simultaneously and continuously to a reactor at ratios of from about 0.8 to about 4 moles of the hexavalent chromium compound, from about 2 to about 20 moles of the acid, and from about 0.04 to about 2 liters of water per mole of the o-toluenesulfonamide to provide continuous production of reaction products of the o-toluenesulfonamide and the chromium compound,
    b. a continuously reacting together the o-toluenesulfonamide and the chromium compound in the presence of the acid in the reactor at a temperature of from about 30° to about 70°C. over a means residence time of from about 0.2 to about 4 hours,
    c. continuously removing sufficient reaction mixture from the reactor to maintain a constant volume in the reactor,
    d. cooling and separating crude saccharin, trivalent chromium compound liquor, and unreacted o-toluenesulfonamide from the reaction mixture removed from the reactor,
    e. returning the unreacted o-toluenesulfonamide to step (a), and
    f. recovering the saccharin and the trivalent chromium as individual reaction products.

2. The process of claim 1 wherein the hexavalent chromium compound is chromic acid.

3. The process of claim 1 wherein the hexavalent chromium compound is sodium bichromate.

4. The process of claim 1 wherein less than 11 moles of sulfuric acid is used to produce one mole of saccharin.

* * * * *